US008752036B2

(12) United States Patent
Kalogeropulos et al.

(10) Patent No.: US 8,752,036 B2
(45) Date of Patent: Jun. 10, 2014

(54) THROUGHPUT-AWARE SOFTWARE PIPELINING FOR HIGHLY MULTI-THREADED SYSTEMS

(75) Inventors: Spiros Kalogeropulos, Los Gatos, CA (US); Partha Tirumalai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 276 days.

(21) Appl. No.: 13/285,891

(22) Filed: Oct. 31, 2011

(65) Prior Publication Data

US 2013/0111453 A1 May 2, 2013

(51) Int. Cl.
*G06F 9/45* (2006.01)
(52) U.S. Cl.
USPC ............ 717/161; 717/149; 717/151; 717/160
(58) Field of Classification Search
CPC ....... G06F 8/443; G06F 8/445; G06F 8/4452; G06F 8/447; G06F 9/3836
USPC ........................................................ 717/161
See application file for complete search history.

(56) References Cited

U.S. PATENT DOCUMENTS

| 5,920,724 | A * | 7/1999 | Chang ........................... 717/161 |
| 7,007,271 | B2 * | 2/2006 | Kumar et al. .................. 717/151 |
| 7,698,696 | B2 * | 4/2010 | Ogawa et al. .................. 717/151 |
| 8,516,454 | B2 * | 8/2013 | Mizrachi et al. .............. 717/140 |
| 2009/0113404 | A1 * | 4/2009 | Takayama et al. ............. 717/149 |
| 2010/0011339 | A1 * | 1/2010 | Eichenberger et al. ........ 717/106 |
| 2011/0265068 | A1 * | 10/2011 | Elnozahy et al. ............. 717/149 |

* cited by examiner

*Primary Examiner* — Anna Deng
*Assistant Examiner* — Andrew M Lyons
(74) *Attorney, Agent, or Firm* — Marsh Fischmann & Breyfogle LLP; Daniel J. Sherwinter (57) ABSTRACT

Embodiments of the invention provide systems and methods for throughput-aware software pipelining in compilers to produce optimal code for single-thread and multi-thread execution on multi-threaded systems. A loop is identified within source code as a candidate for software pipelining. An attempt is made to generate pipelined code (e.g., generate an instruction schedule and a set of register assignments) for the loop in satisfaction of throughput-aware pipelining criteria, like maximum register count, minimum trip count, target core pipeline resource utilization, maximum code size, etc. If the attempt fails to generate code in satisfaction of the criteria, embodiments adjust one or more settings (e.g., by reducing scalarity or latency settings being used to generate the instruction schedule). Additional attempts are made to generate pipelined code in satisfaction of the criteria by iteratively adjusting the settings, regenerating the code using the adjusted settings, and recalculating whether the code satisfies the criteria.

17 Claims, 6 Drawing Sheets

THROUGHPUT-AWARE SOFTWARE PIPELINING FOR HIGHLY MULTI-THREADED SYSTEMS

FIELD

Embodiments of the present invention relate generally to compilers, and, more particularly, to compiling for multi-threaded systems.

BACKGROUND

The development of software applications typically involves writing software code in a high-level programming language and translating the code into a lower-level machine language that can be executed by a computer system. Many so-called "compiler" applications exist to effectuate the translation from the high-level "source code" into a lower-level "executable code." These compilers may implement many different types of functionality, for example, that enhance the efficiency of the compilation process through software pipelining, instruction scheduling, and other techniques.

Multi-core and multi-threaded architectures have become very popular in recent years. On these systems, more than one thread (i.e., instruction execution stream) can run simultaneously on a core, so that a core's computing resources could be shared by more than one thread. However, throughput-oriented, multi-core and multi-threaded architectures tend to sacrifice single-thread performance due to resource sharing and potentially increased instruction latencies.

Traditional software pipelining and instruction scheduling are tuned to produce optimal code for single-thread execution. Accordingly, instruction sequences are generated in an attempt to use all the resources of the core and keep the pipeline busy by covering the full instruction latencies of the pipeline. However, such optimal single-thread binaries may not be optimal when many threads are sharing the computing resources of a core. There may be little advantage to covering full instruction latencies when core resources are shared by multiple threads, and using the full instruction latencies in these algorithms may negatively impact performance. For example, using single-thread optimizations in a multi-threaded environment can result in increased register spilling and reloading, excessive loop unrolling, and/or other undesirable side effects.

BRIEF SUMMARY

Among other things, systems and methods are described for throughput-aware software pipelining in compilers to produce optimal code for single-thread and multi-thread execution on multi-threaded systems. A loop is identified within source code as a candidate for software pipelining. An attempt is made to generate pipelined code (e.g., generate an instruction schedule and a set of register assignments) for the loop in satisfaction of pipelining criteria, like maximum register count, minimum trip count, target core pipeline resource utilization, maximum code size, etc. If the pipelining fails to generate pipelined code in satisfaction of the criteria, embodiments adjust one or more settings (e.g., by reducing scalarity and/or latency settings being used by the compiler to generate the instruction schedule). Additional attempts are made to generate pipelined code in satisfaction of the criteria by iteratively adjusting the settings, regenerating the pipelined code using the adjusted settings, and recalculating whether the pipelined code satisfies the criteria.

In one set of embodiments, a method is provided for throughput-aware software pipelining of an inner loop of a source code listing using a pipelining module of a computer-implemented compiler. The method includes: identifying an instruction of the inner loop; calculating a base latency for the instruction; defining a loop latency in the pipelining module as the base latency for the instruction; generating a proposed instruction schedule for the inner loop at least as a function of the loop latency in the pipelining module; calculating whether the proposed instruction schedule meets a predetermined set of optimization criteria; while the proposed instruction schedule does not meet the predetermined set of optimization criteria, iteratively performing steps comprising: reducing the loop latency in the pipelining module; regenerating the proposed instruction schedule for the inner loop at least as a function of the reduced loop latency in the pipelining module; and calculating whether the regenerated proposed instruction schedule meets the predetermined set of optimization criteria; and compiling the inner loop according to the proposed instruction schedule when the proposed instruction schedule meets the predetermined set of optimization criteria.

In another set of embodiments, a computer-implemented compiler system is provided for throughput-aware software pipelining of an inner loop of a source code listing using a pipelining module of a computer-implemented compiler. The system includes: a driver module, configured to identify an inner loop of a source code listing of a computer program for pipelining; a pipelining module in communication with the driver module; and a multi-thread optimization module in communication with the pipelining module. The pipelining module is configured to: identify an instruction of the inner loop; calculate a base latency for the instruction; define a loop latency as the base latency for the instruction; generate a proposed instruction schedule for the inner loop at least as a function of the loop latency in the pipelining module; and calculate whether the proposed instruction schedule meets a predetermined set of optimization criteria. The multi-thread optimization module is configured, while the proposed instruction schedule does not meet the predetermined set of optimization criteria, to iteratively perform steps including: reducing the loop latency in the pipelining module; regenerating the proposed instruction schedule for the inner loop at least as a function of the reduced loop latency in the pipelining module; and calculating whether the regenerated proposed instruction schedule meets the predetermined set of optimization criteria.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
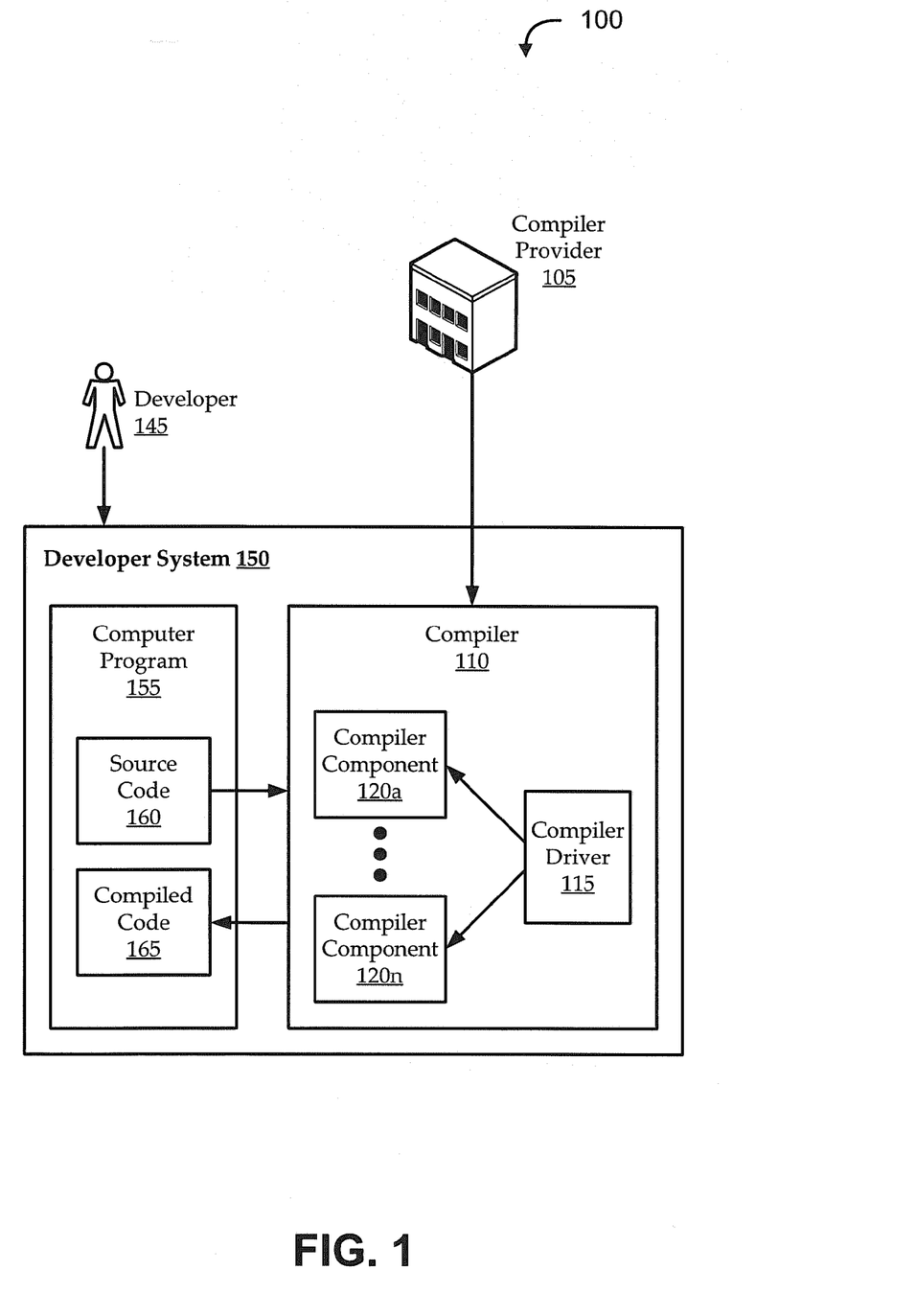
FIG. 1 shows a typical software development environment to provide a context for various embodiments.

Turning first to FIG. 1, a typical software development environment 100 is shown to provide a context for various embodiments. A compiler provider 105 provides a compiler 110 and/or compiler-related services. For example, the compiler provider 105 is a vendor and/or developer of the compiler 110, an entity that provides service and/or support for the compiler 110, etc.

The compiler 110 includes a number of compiler components 120, each configured to effectuate certain compiler 110 functionality with certain types of code. The compiler 110 also includes a compiler driver 115 (e.g., that may technically be implemented as one of the compiler components 120, but is separated out for the sake of clarity) that is configured to control operation of the other compiler components 120. As used herein, a "compiler component 120" can be a sub-component of another compiler component 120 or can include one or more sub-components.

The compiler 110 runs on a developer system 150 (e.g., a personal computer or other computing platform) to compile source code 160 of a computer program 155 into compiled code 165 (e.g., an executable version) of the computer program 155. A developer 145 (e.g., a software programmer) may develop a computer program 155 by writing and debugging source code 160 in a high-level programming or scripting language, like "Java," "C," "PHP," "Visual Basic," "Perl," etc. The developer 145 then sends the source code 160 to the compiler 110 (e.g., which may or may not be stored locally on the developer system 150), which translates the source code 160 to compiled code 165 using its various compiler components 120 as controlled by the compiler driver 115.

Many compilers are configured to perform pipelining functionality. In general, "pipelining" refers herein to software pipelining, which can include any of various techniques used by compilers to optimize loops, for example, by revealing opportunities for parallelization. For example, within a loop of program code, some number of clock cycles (e.g., twelve) passes between initiating a particular function and obtaining the output of the function. Rather than waiting for the function to complete, it may be desirable to schedule one or more additional functions to be initiated during that latency period, for example, by "unrolling the loop." By compiling the source code 160 in this way, more efficient compiled code 165 can be generated. As discussed more fully below, embodiments address some shortcomings of traditional software pipelining schemes, particularly in the context of multi-threaded environments.

Figure 2:
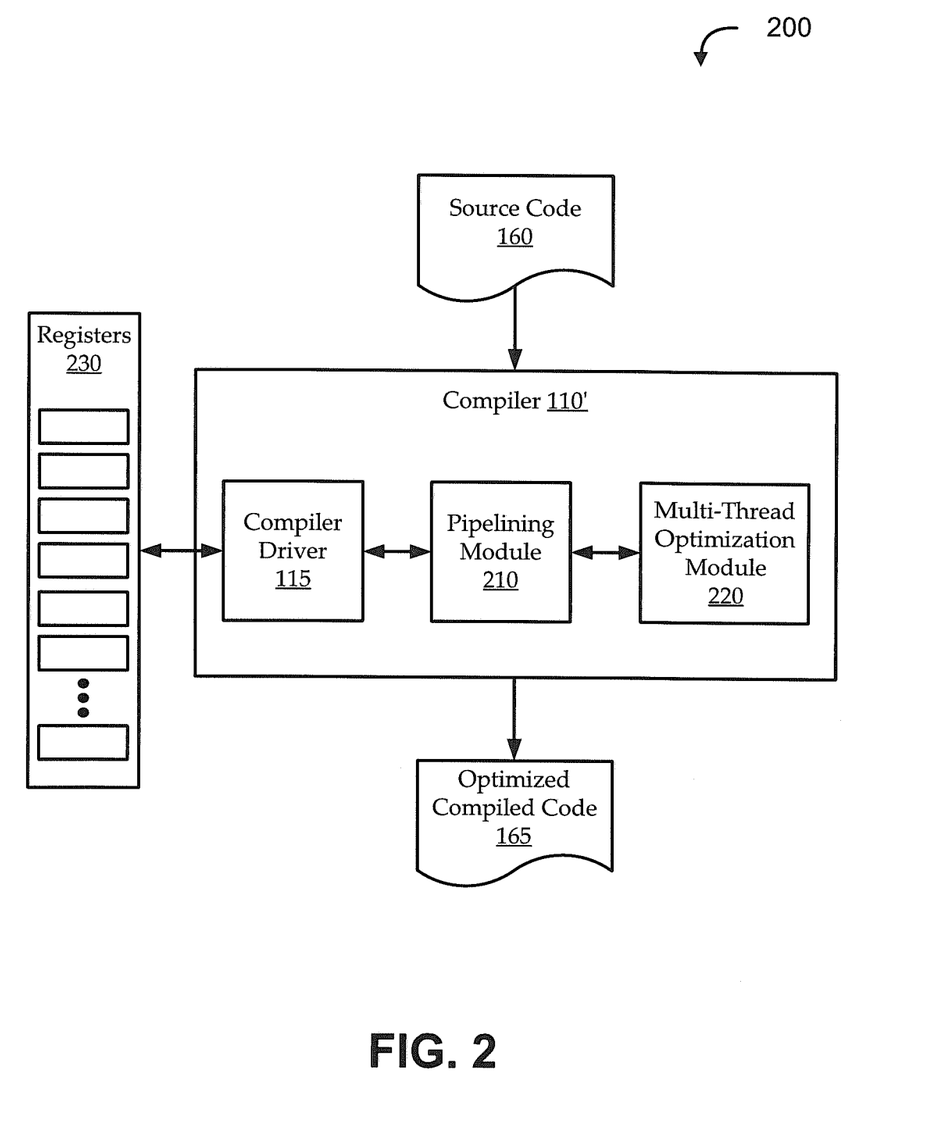
FIG. 2 shows a block diagram of an exemplary compiler, according to various embodiments.

FIG. 2 shows a block diagram 200 of an exemplary compiler 110', according to various embodiments. As described with reference to FIG. 1, source code 160 is received by the compiler 110' and processed to generate executable optimized compiled code 165. The compiler 110' includes one or more compiler components, including a compiler driver 115, a pipelining module 210, and a multi-thread optimization module 220. Each module will be described in turn.

The compiler driver 115 handles general execution of the compilation. For example, the compiler driver 115 passes appropriate settings and/or other information (e.g., variable values, etc.) to various compiler components and controls execution of those compiler components. As compilation proceeds successfully, the compiler driver 115 can run through the compiler components in turn to compile the source code 160 into compiled code 165.

One such compiler component that may be controlled by the compiler driver 115 is the pipelining module 210. Embodiments of the pipelining module 210 handle software pipelining functionality, including implementing various techniques to produce an optimal instruction sequence for a loop. As used herein, "pipelining" includes any type of software pipelining and related functionality, including instruction scheduling, loop unrolling, etc. An instruction schedule may be considered optimal when a threshold of instruction latencies is covered and a threshold of resource utilization is reached subject to dependences between the instructions in the loop body. It will be appreciated that terms like "optimal" are intended to be construed as ordinarily used in software optimization and related arts. For example, it may not be possible or practical to utilize 100% of a core's resources, though there is a point at which those of skill in the art would consider the resource usage to be optimized in the context of software pipelining.

Execution can be considered optimal at steady state, for example, after ramp up iterations (sometimes referred to as the "prologue") have completed. The nucleus of the software pipelined schedule is typically considered to be the kernel, where steady state execution occurs. In the kernel, instructions from multiple iterations are tightly interleaved to obtain optimal execution. Pipelining can be configured to be more or less aggressive. For example, very aggressive pipelining may try to cover every latent clock cycle for maximum resource usage. However, aggressive schedule generation by software pipelining can lead to various side effects.

One such side effect is increased register pressure. As illustrated, the compiler driver 115 is monitoring the use of a number of registers 230. Each instruction may involve one or more values (e.g., outputs of a function initiated by the instruction), and each value may need to be stored in a register (e.g., for use by a different instruction). In order to interleave instructions from different iterations in the software pipelined kernel, new register names are used to hold the values defined by the same instruction in different iterations of a loop. This prevents values associated with an iteration of the loop from destroying values from previous iterations of the loop that are still waiting to be consumed. If the number of simultaneous live value ranges in the kernel exceeds the number of available machine registers, the pipelining module 210 may consider the loop to not be a candidate for software pipelining. Otherwise, the pipelining could result in register spills and/or reloads during register allocation. Notably, scheduling for long instruction latencies can result in an increase in the number of simultaneously live value ranges (e.g., as more additional instructions may be scheduled to fill the latency), thereby increasing the register pressure.

Another such side effect is an increased time to reach steady state. Longer instruction latencies tend to increase the number of iterations needed to form the kernel and the prologue, thereby increasing the minimum number of iterations needed to enter the software-pipelined kernel. Loop executions with a trip count that is less than a minimum number of iterations required for software pipelining may be excluded from the software-pipelined code and do not benefit from the resulting optimizations.

For the sake of illustration, software pipelining is applied to loops with no control flow or to those loops where the control flow has been eliminated by techniques such as if-conversion. A first step is typically to collect information about the execution characteristics of the loop by building the data dependence graph where the nodes are instructions and the edges represent the data dependencies. The next steps can then include producing a throughput-aware (e.g., optimal) schedule, determining the number of iterations involved in composing the kernel, performing virtual register renaming, and confirming that the loop live values at any time are less than or equal to the available machine registers. If the loop live values at any time are more than the available machine registers, the loop may not be considered a suitable candidate for software pipelining. Attempts to adjust the schedule may then be made to get the registers to fit within the available physical registers. However, these attempts typically fail.

Traditional software pipelining techniques are typically tuned for single-thread environments. However, different processing environments can vary in the number of cores, the number of threads supported by each core, the amount of scalarity supported, and other factors. Suppose the compiled code 165 will be executed on a single-thread processor, and the compiler 110' is faced with an instruction having a latency of N clock cycles. The pipelining module 210 may attempt to cover the entire N-cycle latency (e.g., by unrolling the loop), and may determine that this generates loop live values that exceed the available machine registers. Accordingly, a traditional pipelining module 210 may consider the loop to be a poor candidate for pipelining and may not perform pipelining on that loop. However, suppose the compiled code 165 will be executed on a processor core configured to run two threads, and 50% of the core's resources are assumed to be in use on average by other applications. Now, only around half of the N-cycle latency may have to be covered to optimize the pipelining, while the remaining latent clock cycles are assumed to be covered by other applications' instructions running concurrently on the core. It may be that covering only N/2 cycles of latency does not generate loop live values that exceed the available machine registers, and the loop may now be a good candidate for pipelining.

Embodiments of the multi-thread optimization module 220 help optimize functionality of the pipelining module 210 when compiling for a multi-threaded execution environment. For example, in the above example, the multi-thread optimization module 220 can adjust the parameters of the loop instruction to appear to the pipelining module 210 as if it has less associated latency. Alternatively, the multi-thread optimization module 220 can adjust compilation settings to effectively reduce the scalarity of the model being used by the pipelining module 210. For example, rather than the pipelining module 210 assuming that two floating point operations can be run concurrently by the core (e.g., each having a latency of twelve clock cycles, thereby leaving twenty-four cycles of latency for the pipelining module 210 to cover), the scalarity is effectively reduced to yield a model in which the pipelining module 210 assumes that only a single floating point operation can be run at a time by the core (e.g., thereby leaving only twelve cycles of latency for the pipelining module 210 to cover). As discussed more fully below, embodiments of the optimization module 220 cause the pipelining module 210 to iterate through software pipelining attempts using different parameters in order to optimize each loop within predetermined criteria.

Figure 3:
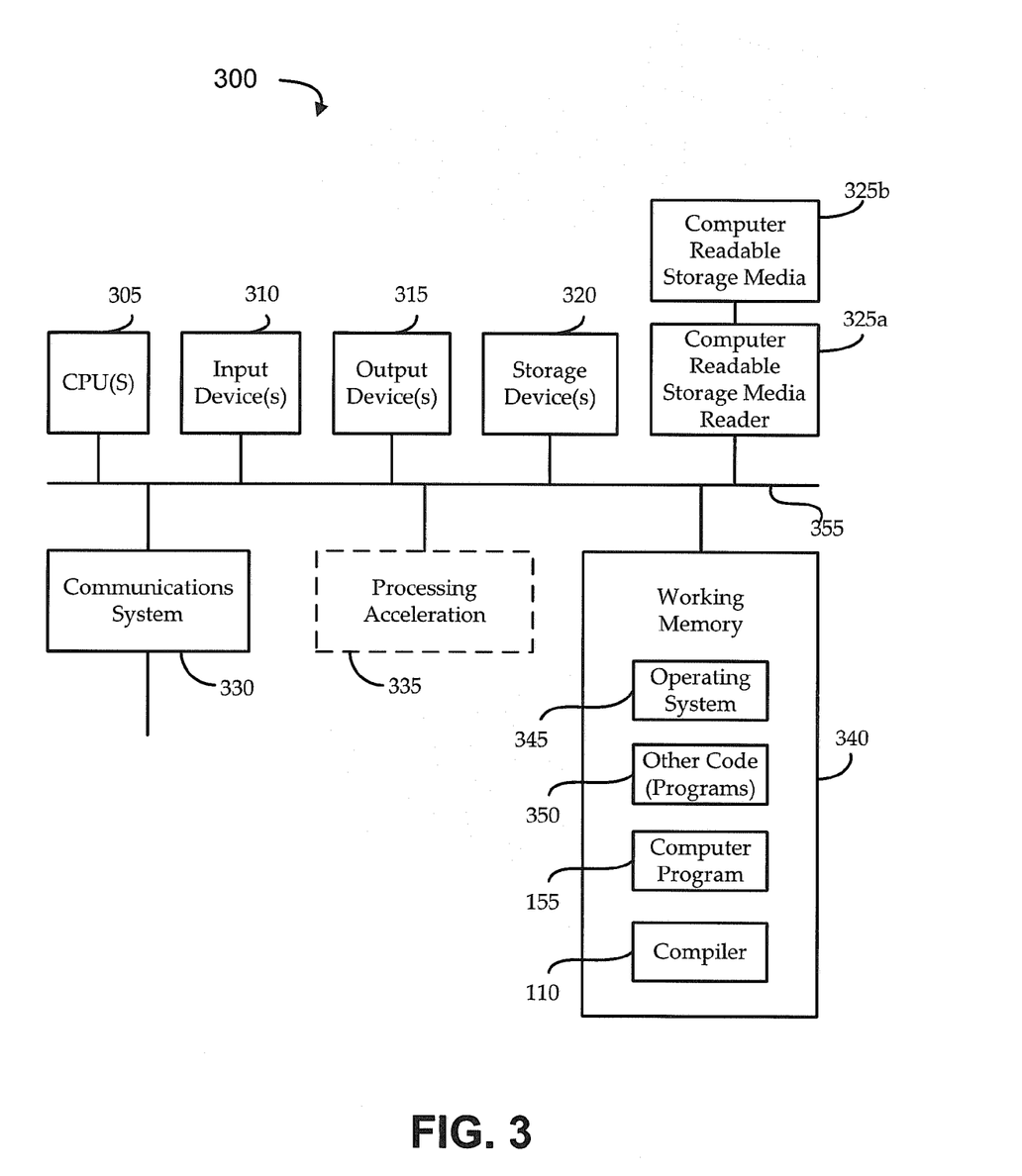
FIG. 3 shows an exemplary computational environment, in the context of which various embodiments may be implemented.

As described above, the compiler 110 functionality is implemented in a computational environment, such as developer system 150 of FIG. 1. FIG. 3 shows an exemplary computational environment 300, in the context of which various embodiments may be implemented. The computational environment 300 may be implemented as or embodied in single or distributed computer systems, or in any other useful way. The computational environment 300 is shown including hardware elements that may be electrically coupled via a bus 355.

The hardware elements may include one or more central processing units (CPUs) 305, one or more input devices 310 (e.g., a mouse, a keyboard, etc.), and one or more output devices 315 (e.g., a display device, a printer, etc.). The computational environment 300 may also include one or more storage devices 320. By way of example, storage device(s) 320 may be disk drives, optical storage devices, solid-state storage device such as a random access memory (RAM) and/or a read-only memory (ROM), which can be programmable, flash-updateable, and/or the like.

The computational environment 300 may additionally include a computer-readable storage media reader 325a, a communications system 330 (e.g., a modem, a network card (wireless or wired), an infra-red communication device, etc.), and working memory 340, which may include RAM and ROM devices as described above. In some embodiments, the computational environment 300 may also include a processing acceleration unit 335, which can include a DSP, a special-purpose processor, and/or the like.

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer described above with respect to the computational environment 300.

The computational environment 300 may also include software elements, shown as being currently located within a working memory 340, including an operating system 345 and/or other code 350, such as an application program (which may be a client application, web browser, mid-tier application, RDBMS, etc.). As described above, embodiments of the compiler 110 may interact with a computer program 155 in working memory 340. As described above, a compiler 110 is a set of programs for translating source code 160 into another computer language, or target code (e.g., compiled code 165).

For example, software code may typically be written by a programmer designer in a high-level language such as C, C++, Fortran, or other. This so-called source code 160 may be stored on a computer readable medium (e.g., storage device(s) 320 or computer readable storage medium 325b). A command instruction, which may be entered at a prompt by a user or placed within a scripting language with any necessary options, may be executed in order to compile the source code 160. As described herein, embodiments of the compiler 110 are implemented as a series of compiler components 120 executed by a compiler driver 115. During compilation, a pipelining module 210 and an optimization module 220 can be used to implement software pipelining functionality that is optimized for a multi-core environment.

It should be appreciated that alternate embodiments of a computational environment 300 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 300 may include code 350 for implementing embodiments of the present invention as described herein.

Figure 4:
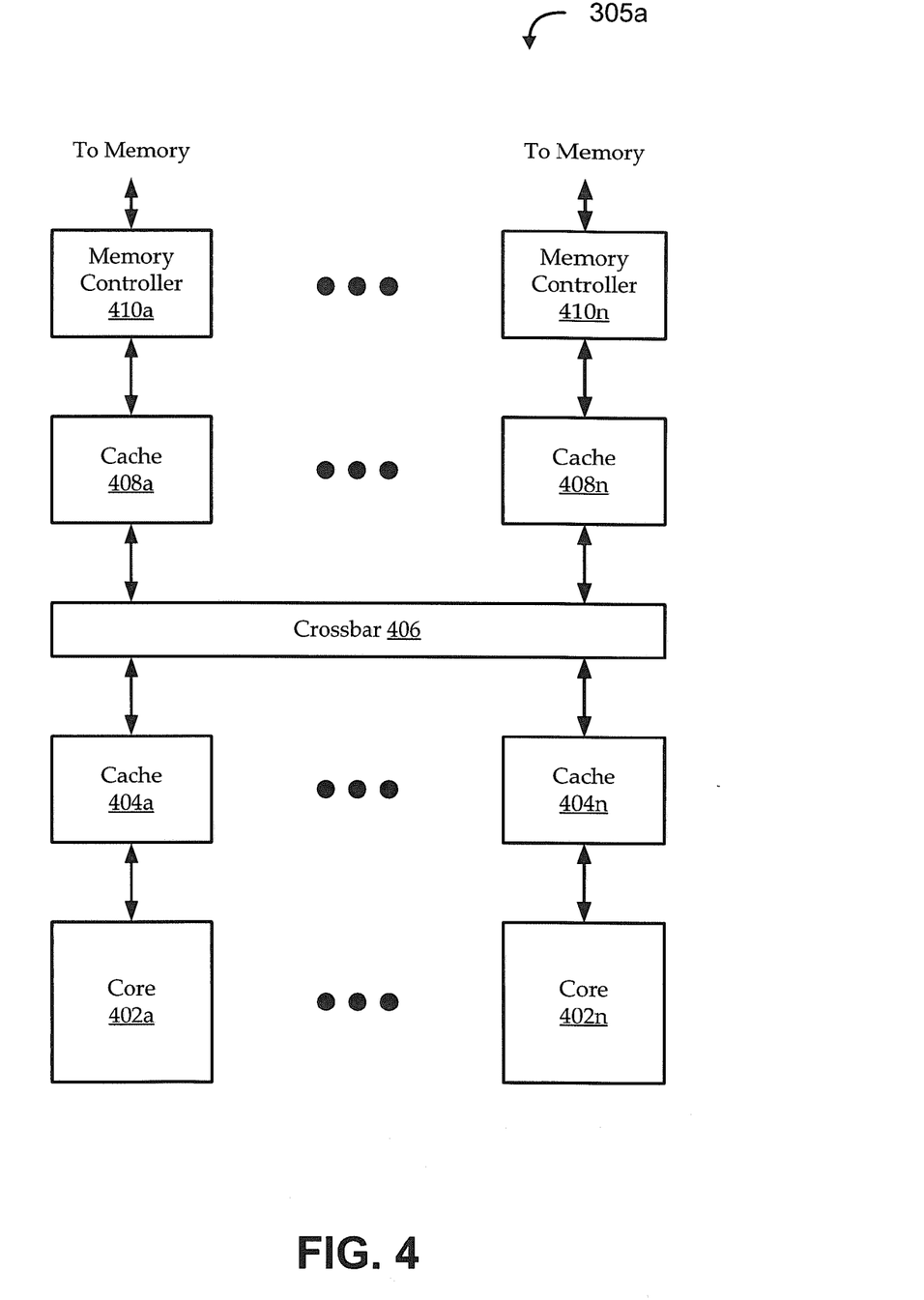
FIG. 4 shows an illustrative embodiment of a multi-core microprocessor for use with various embodiments.

FIG. 4 shows an illustrative embodiment of a multi-core microprocessor 305a for use with various embodiments. The microprocessor 305a may be an implementation of one or more of the CPUs 305 of FIG. 3, and is shown as having an arbitrary number of cores 402a-402n. Each core 402 may include a superscalar micro-architecture with one or more multi-stage pipelines.

Each core 402 may be configured to execute instructions of software applications corresponding to an instruction set architecture (ISA) such as x86, SPARC, PowerPC, MIPS, ARM, etc. Also, each core 402 may be designed to execute multiple strands, or threads. For example, a multi-thread software application may have each of its software threads scheduled to be executed on a separate pipeline within a core 402, or alternatively, a pipeline may process multiple threads via control at certain function units. Each core 402 may comprise a first-level cache 404 (e.g., instruction cache, or "i-cache") that is physically implemented inside or outside the respective core 402.

A crossbar 406 may be used to connect each core 402 and first-level cache 404 to shared resources such as second-level caches 408 and other memory via memory controllers 410. Interfaces between crossbar 406 and the different levels of caches 404 and 408 may comprise any suitable technology. In other embodiments, other levels of caches may be present between cache 408 and memory controller 410. Also, an I/O bus adapter, not shown, may be coupled to crossbar 406 to provide an interface for I/O devices to caches 404 and 408 and cores 402. In another embodiment, an I/O interface may be implemented in memory controller 410. Memory controllers 410 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 410 on microprocessor 305a.

A multi-thread software application may be written by a designer to be executed on a multi-core processor, such as the one in FIG. 4, or on a multi-processor chip. The multi-thread program may be compiled prior to execution on a system such as microprocessor 305a. As described above, a compiler is a set of programs for translating source code, such as a multi-thread software program, into another computer language, or target code.

Front-end compilation can translate the source code to a lower-level representation. Syntactic and semantic processing, as well as some optimizations, are typically performed at this stage. Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases. An advantage of splitting the front-end of a compiler from the back-end is that front-ends for different languages may be combined with back-ends for different processors. Generally speaking, the front-end performs syntactic and semantic processing and translates the source code to a lower-level of representation.

Optimizations may be performed on the lower-level representation. The independence provided by this representation of the source code from the machine code allows generic optimizations to be shared among different languages supported by the compiler. In one embodiment, the compilation method is completely static and the lower-level representation is an output of a front-end phase to be further compiled statically into machine code. Machine code is a general term that refers to patterns of bits with different patterns corresponding to different commands, or instructions, to the machine, or processor, and to the operating system. In an alternative embodiment, the compilation method is static upfront wherein the lower-level representation is bytecode to be further compiled dynamically into machine code by a JIT compiler within a virtual machine.

The back-end may perform more transformations and optimizations for a particular computer architecture and processor design. A processor may be designed to execute instructions of a particular instruction set architecture (ISA), but the processor may have one or more processor cores (e.g., as shown). The manner in which a software application is executed in order to reach peak performance may differ greatly between a single-, dual-, or quad-core processor, and further between cores supporting different numbers of threads, having different amounts of instruction cache 404, etc. Similarly, the manner in which to compile the software application in order to achieve peak performance may vary between a single-core and a multi-core processor. For example, as discussed above, one back-end optimization that may be performed is software pipelining, and software pipelining may be optimized according to various embodiments to account for a multi-threaded environment.

Figure 5:
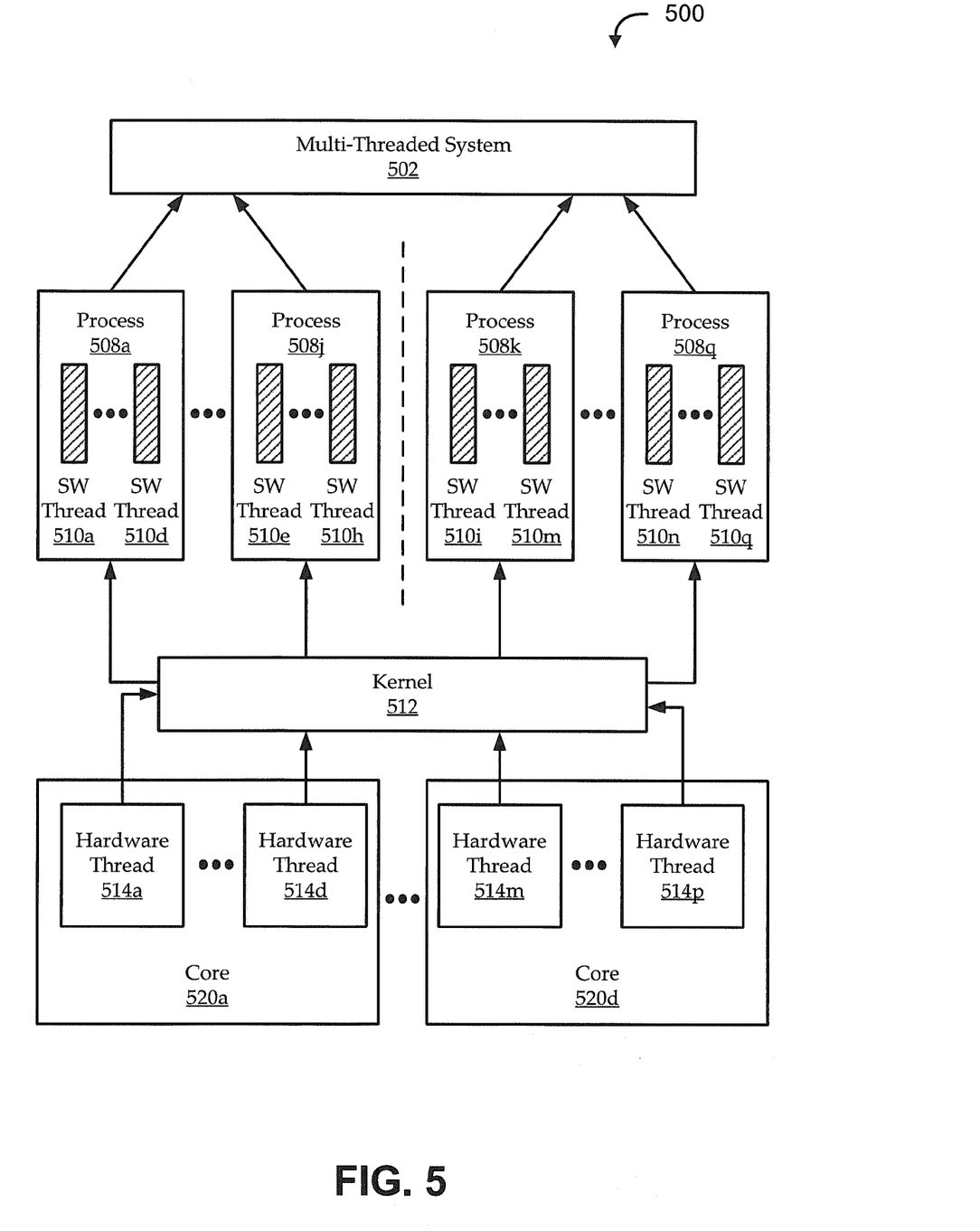
FIG. 5 illustrates one embodiment of hardware and software thread interrelationships.

For the sake of added clarity, FIG. 5 illustrates one embodiment of hardware and software thread interrelationships 500. Here the partitioning of hardware and software resources and their interrelationships during the execution of one or more applications is shown. In one embodiment, the operating system on the nodes in multi-processor system 502 (e.g., implemented as the CPU(s) 305 of FIG. 3) allocates regions of memory for instructions and data.

When applications execute, each application may include multiple processes, such as processes 508a-508j and 508k-508q. Each process 508 may own its own resources such as an image of memory, or an instance of instructions and data before application execution. Also, each process 508 may have process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and set of permissions.

Multi-threaded system 502 (e.g., a system having multiple logical processors) typically supports many processes. Within each of the processes 508 may be one or more software threads 510. For example, process 508a comprises SW threads 510a-510d. A thread can execute independent of other threads within its corresponding process and a thread can execute concurrently with other threads within its corresponding process. Generally speaking, each of the software threads 510 belongs to only one of the processes 508. Therefore, for multiple threads 510 of the same process 508, such as SW threads 510a-510d of process 508a, the same data content of a memory line, for example the line of address 0xff38, will be the same for all threads. This assumes the inter-thread communication has been made secure and handles the conflict of a first thread, for example SW thread 510*a*, writing a memory line that is read by a second thread, for example SW thread 510*d*. However, for multiple threads of different processes, such as SW thread 510*a* in process 508*a* and SW thread 510*e* of process 508*j*, the data content of memory line with address 0xff38 will more than likely be different for the threads. In some cases, multiple threads of different processes may see the same data content at a particular address, for example, if they are sharing a same portion of address space.

In general, for a given application, kernel 512 sets up an address space for the application, loads the application's code into memory, sets up a stack for the program, branches to a given location inside the application, and begins execution of the application. Kernel 512 may further determine a course of action when insufficient memory is available for the execution of the application. As stated before, an application may be divided into more than one process 508 and system 502 may be running more than one application. Therefore, there may be several processes running in parallel. Kernel 512 may decide at any time which of the simultaneous executing processes should be allocated to the processor(s). Kernel 512 may allow a process to run on a core of a processor, which may have one or more cores, for a predetermined amount of time referred to as a time slice.

In one embodiment, only one process can execute at any time per processor core, CPU thread, or Hardware Thread. As illustrated, hardware threads 514*a*-514*d* and 514*m*-514*p* include hardware that can handle the execution of the one or more software threads 510 within one of the processes 508. This hardware may be a core 520, or a subset of circuitry within a core configured to execute multiple threads. For example, system 502 may include a multi-core microprocessor (e.g., microprocessor 305*a* of FIG. 4 with cores 520). Although the multi-threading hardware may reside within the system 502, hardware threads 514 are shown outside of system 502 for illustrative purposes of assignments made by kernel 512.

It will be appreciated that any of the above systems, including those described in FIGS. 1-5, can be used to effectuate techniques used by embodiments described herein. Further, many architectures are possible with which to implement embodiments, including implementing optimized software pipelining. Accordingly, discussions herein of various embodiments, including method embodiments described below with reference to FIG. 6, should not be construed as being implemented in any particular hardware environment, except where explicitly noted.

Figure 6:
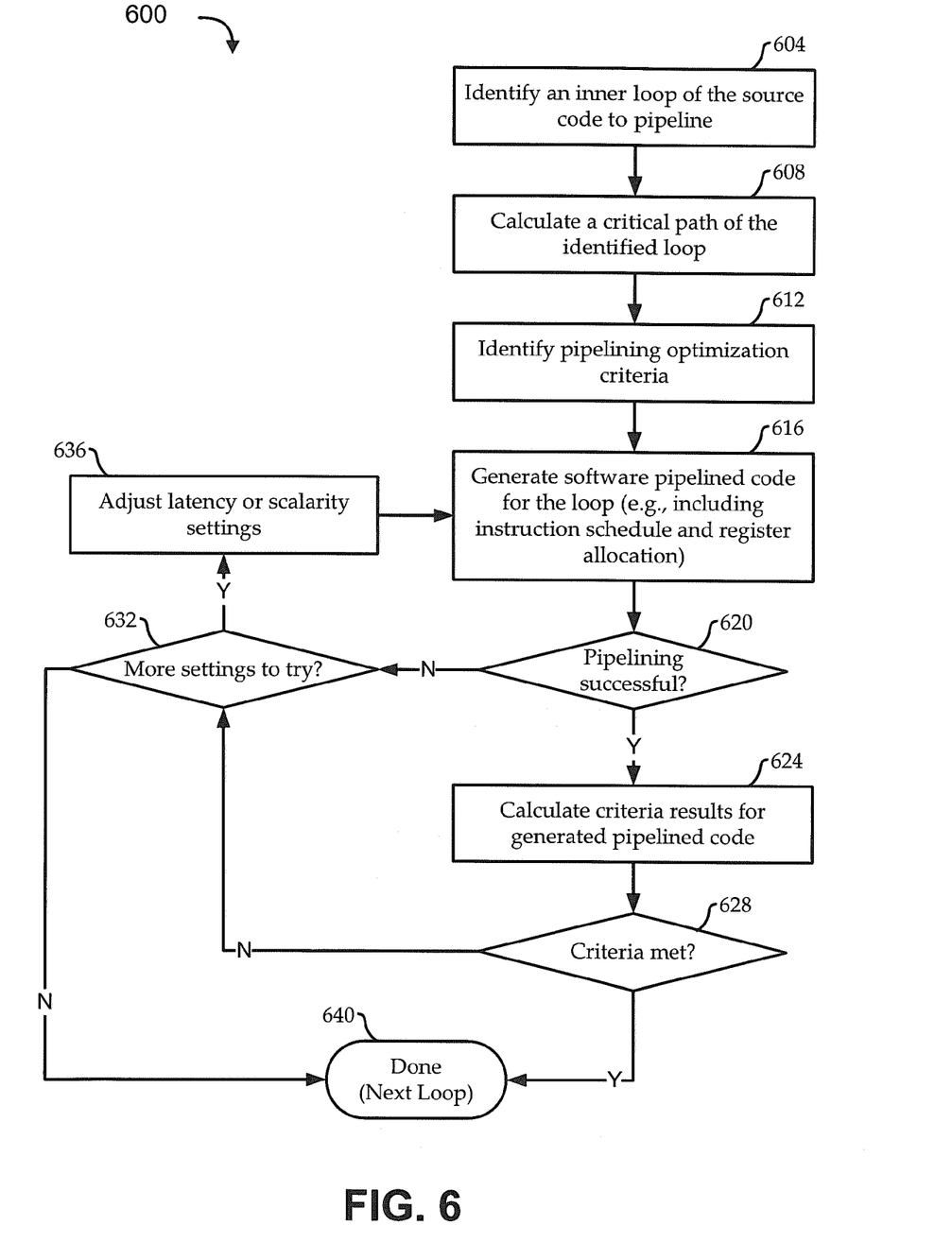
FIG. 6 shows a flow diagram of an illustrative method for throughput-aware software pipelining, according to various embodiments.

Turning to FIG. 6, a flow diagram is shown of an illustrative method 600 for throughput-aware software pipelining, according to various embodiments. Embodiments of the method 600 begin at block 604 by identifying an inner loop of the source code to pipeline. Typically, the inner loop is an innermost loop of the program represented by the source code, though some embodiments of inner loops contain additional (fully unrolled) loops within them.

The loop includes at least one instruction, and each instruction has an associated latency. For example, an instruction's latency may be calculated as the number of clock cycles it takes for the instruction to produce a result that can then be used by a later instruction that consumes that result. Complex instructions often involve additional cycles for processing the instruction, so that the instruction latencies tend to be greater than the minimum and are different for different instructions. At block 608, a recurrence critical path is calculated for the identified loop. The recurrence critical path may be the longest latency chain of instructions producing a result that is consumed in a future iteration of the loop. Suppose, for example, that a loop includes a floating point operation having a latency of twelve clock cycles (e.g., it takes twelve clock cycles before the results of the operation are processed and consumed). Even if all other instructions in the loop can be parallelized (e.g., all the other (assumed to be lower latency) instructions are processed while waiting for the floating point operation to be processed), it may not be possible to perform the loop in fewer than the twelve cycles needed for the highest latency operation. Accordingly, the execution rate of the loop may be substantially governed by the longest latencies of recurrence critical path instructions in the loop. In some embodiments, the recurrence critical path is identified according to a dependence graph of the loop body. For example, analysis techniques are used to examine particularly long live ranges that can cause high register pressure and/or schedule stretching.

At block 612, one or more pipelining optimization criteria are identified. In some embodiments, the pipelining optimization criteria are preset by the user as part of the compilation process (e.g., using command line or menu options, etc.). In other embodiments default criteria are used. Different types of pipelining optimization criteria can be set and/or identified, and some or all of the pipelining optimization criteria may be considered as part of a model for use by the compiler. The model can be considered as representing an assumed execution environment.

One such pipelining optimization criteria may be a maximum register count. As described above with reference to FIG. 2, a limited number of registers 230 may be available for use by the instructions in temporarily storing values. As instructions are more aggressively pipelined, the compiler may be processing more instructions concurrently, which may involve concurrent use of more registers. This can cause undesirable levels of register pressure, particularly as instruction latencies and/or scalarity increase. For example, pipelining may involve processing more instructions concurrently to fill the clock cycles left behind by a long-latency instruction. Similarly, when multiple instructions can be processed concurrently by a higher scalar system, it may take more instructions to fill the associated latent clock cycles. Thus, specifying a maximum register count may help limit register pressure by allowing the pipelining functionality to reject loops as candidates when pipelining those loops would exceed that maximum register count.

Another such pipelining optimization criteria may be a maximum code size. Typically, a processor includes instruction cache of fixed size. Suppose the instruction cache is 32-kilobytes, and the processor includes four cores, each configured to handle four threads. If all sixteen possible threads are equally sharing the instruction cache, each thread would only have two kilobytes of instruction cache available to it. Only five-hundred, four-byte instructions would be able to fit in the two-kilobyte share of instruction cache. Accordingly, it may be desirable to set a maximum code size (e.g., of five-hundred instructions) to ensure that an instruction schedule generated by the pipelining functionality does not exceed available instruction cache for the execution environment in which it is likely to run.

Yet another such pipelining optimization criteria may be a minimum trip count. The trip count generally refers to the number of iterations of the loop. When the trip count is too small, it may not be feasible to pipeline the loop. Accordingly, it may not be possible to consider as candidates for pipelining any loops having too small a trip count.

Still another such pipelining optimization criteria may be a target utilization. In a multi-threaded execution environment, a single thread may have access to only a portion of the total resources (e.g., of the core pipeline). Some embodiments assume that a certain number of threads will be running concurrently on the core pipeline and equally sharing the resources, so that the utilization for a given thread can be thought of as the inverse of the number of threads sharing the resources. For example, a single thread may have 100-percent utilization of the core pipeline resources, while two threads may each have 50-percent utilization of the core pipeline resources. According to some embodiments, the amount of latency to cover with pipelining can be adjusted according to the utilization. For example, if twelve clock cycles would be covered by pipelining using a single thread (i.e., at 100% utilization), it may be assumed that half of those cycles would be covered by another thread running concurrently in a dual-thread environment (i.e., the thread only accounts for up to half of the core pipeline resources, so as few as half of those resources, or six clock cycles, should be covered by the pipelining functionality).

At block 616, software pipelined code is generated for the loop. Typically, generation of the pipelined code includes generating an instruction schedule and allocating (e.g., "naming") registers for storage of instruction-related values. A determination is made at block 620 as to whether the pipelining at block 616 was successful. In some embodiments, a determination may be made as to whether a valid instruction schedule could be generated, or whether the pipelining functionality rejected the loop as a candidate for pipelining.

At block 624, criteria results are calculated for the generated pipelined code. In some cases, the pipelined code will not be successfully generated (e.g., at blocks 616 and 620) if certain pipelining criteria are not met. In other cases and/or in other embodiments, calculation of criteria results in a determination of whether those results meet the predetermined set of pipelining optimization criteria are performed separately from the generation of the pipelined code. Calculating the criteria results at block 624 may involve various types of functionality, for example, depending on the type of criteria being calculated. In some embodiments, calculating the criteria results involves calculating whether executing the proposed instruction schedule would involve using a number of registers in excess of a predetermined maximum register count. For example, a calculation may be made to determine whether loop live values at any time exceed available machine registers. In other embodiments, calculating the criteria results involves calculating whether compiling the inner loop according to the proposed instruction schedule would yield executable code in excess of a predetermined maximum code size. For example, a calculation may be made as to the number of instructions resulting from the pipelining and whether that number of instructions will exceed the available instruction cache at any time.

A determination is made at block 628 as to whether the generated software pipelined code meets the pipelining optimization criteria. If the criteria are met, the method 600 may proceed to processing a next loop at block 640 (e.g., assuming loops remain to be processed or otherwise compiled). Notably, this may be the typical scenario of a traditional single-thread-focused software pipelining function of a compiler. When a loop is identified for software pipelining, and pipelined code generated for the loop is determined not to meet certain optimization criteria (e.g., by being unable to process low trip count loops, yielding loop live values that exceed available machine registers, etc.), the loop is simply rejected as a candidate for optimization through software pipelining. On the contrary, embodiments described herein adjust parameters of the pipelining model to allow otherwise rejected loops to still potentially be pipelined.

In particular, embodiments of the method 600 proceed even when the pipelining is determined to be unsuccessful at block 620 or the criteria are determined to have been unsatisfied at block 628. Embodiments may effectively iterate through multiple attempts at software pipelining, changing one or more settings with each iteration (e.g., including scalarity and latency). In a multi-threaded environment, it can be assumed that more than one thread is likely to be sharing core pipeline resources at any given time. As such, pipelining may be considered "optimal" even without completely covering all instruction latencies by assuming that other threads will be covering some of those latent clock cycles. Reducing latency and/or scalarity may effectively account for assumed shared utilization of the core pipelining resources in a multi-threaded environment.

For example, if an instruction has a latency of twelve clock cycles, the pipelining functionality may attempt to cover all twelve cycles using various instruction-level parallelization techniques. The pipelining functionality may determine that covering all twelve cycles is likely to cause excessive register pressure. However, reducing the latency associated with the instruction to eleven clock cycles may be sufficient to relieve the register pressure, and it may be assumed that the remaining latent clock cycles will be covered by another thread sharing the core pipeline. Similarly, while a traditional pipelining function may try to cover all latencies for all pipelines, it may be optimal enough, in a multi-threaded environment, only to cover the latencies for a single pipeline by reducing the scalarity to one. Other parameters may be similarly adjusted.

Regardless of the setting being adjusted, the adjustment may be limited by a threshold amount and/or a predetermined increment. For example, in certain iterative attempts at pipelining the loop, the scalarity may be reduced by a factor of two (e.g., or in any other useful way) down to a minimum scalarity of one. Similarly, in certain iterative attempts at pipelining the loop, the latency may be reduced by a predetermined integer number of clock cycles or by a predetermined percentage of the latency (e.g., one clock cycle or ten percent). The minimum latency may be determined in various ways. In some embodiments, the minimum latency is determined as the latency initially associated with the instruction times the target utilization (i.e., or divided by the number of threads expected to share core pipeline resources). For example, if the instruction has a latency of six clock cycles and the execution environment is modeled as having a target utilization of fifty-percent, the latency can be reduced to no less than three cycles. It is worth noting that the actual latency of the instructions is not changed; rather the latency value used by the pipelining functionality to generate an instruction schedule is changed.

Different embodiments can change the settings in different orders as well. In one embodiment, scalarity is reduced in each iteration until the minimum scalarity is reached. Only after the minimum scalarity is reached is the latency reduced. Latency can then be reduced in different ways. For example, latency can be reduced for simple floating point operations followed by reducing latency for complex instructions, etc.

At block 632, a determination is made as to whether additional settings are available to try. As discussed above, this determination may involve determining whether a minimum threshold has been reached for some or all of the available settings (e.g., scalarity, latency, etc.). If no more settings adjustments are available, the loop may be rejected, and the method 600 may proceed to attempting to process (e.g., pipeline) any remaining loops in the source code. If settings adjustments are available, the settings may be adjusted accordingly at block 636. Using the adjusted settings, the method may regenerate software pipelined code and determine whether the generation is successful and in satisfaction of the pipelining optimization criteria at blocks 616-628. The method 600 may continue to iterate through 616-636 until pipelined code is successfully generated in satisfaction of the pipelining optimization criteria or no settings adjustments remain to be attempted.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for throughput-aware software pipelining of an inner loop of a source code listing using a pipelining module of a computer-implemented compiler, the method comprising:
    identifying an instruction of the inner loop;
    calculating a base latency for the instruction;
    defining a loop latency in the pipelining module as the base latency for the instruction according at least to a scalarity of an assumed multi-threaded execution environment;
    generating a proposed instruction schedule for the inner loop at least as a function of the loop latency in the pipelining module;
    calculating whether the proposed instruction schedule meets a predetermined set of optimization criteria;
    while the proposed instruction schedule does not meet the predetermined set of optimization criteria, iteratively performing steps comprising:
    reducing the loop latency in the pipelining module by reducing at least one of the scalarity or the base latency for the instruction;
    regenerating the proposed instruction schedule for the inner loop at least as a function of the reduced loop latency in the pipelining module; and
    calculating whether the regenerated proposed instruction schedule meets the predetermined set of optimization criteria; and
    compiling the inner loop according to the proposed instruction schedule when the proposed instruction schedule meets the predetermined set of optimization criteria.

2. The method of claim 1, further comprising: determining an assumed number of threads sharing core resources in a multi-threaded environment, wherein reducing the loop latency in the pipelining module comprises reducing the loop latency to substantially equal the base latency divided by the assumed number of threads sharing core resources.

3. The method of claim 1, further comprising:
    determining an assumed number of threads sharing core resources in a multi-threaded environment; and
    determining whether reducing the loop latency by a predetermined increment would cause the loop latency to be less than the base latency divided by the assumed number of threads sharing core resources,
    wherein reducing the loop latency in the pipelining module comprises incrementally reducing the loop latency by the predetermined increment when reducing the loop latency by the predetermined increment would not cause the loop latency to be less than the base latency divided by the assumed number of threads sharing core resources, and wherein reducing the loop latency in the pipelining module comprises incrementally reducing a scalarity of the multi-threaded environment when reducing the loop latency by the predetermined increment would cause the loop latency to be less than the base latency divided by the assumed number of threads sharing core resources.

4. The method of claim 3, wherein the predetermined increment is a single clock cycle.

5. The method of claim 1, wherein the predetermined set of optimization criteria comprises a maximum register count and calculating whether the proposed instruction schedule meets the predetermined set of optimization criteria comprises determining whether executing the proposed instruction schedule would require registers in excess of the maximum register count.

6. The method of claim 1, wherein the predetermined set of optimization criteria comprises a maximum code size and calculating whether the proposed instruction schedule meets the predetermined set of optimization criteria comprises determining whether compiling the inner loop according to the proposed instruction schedule would yield executable code in excess of the maximum code size.

7. The method of claim 1, wherein the predetermined set of optimization criteria comprises a minimum trip count and calculating whether the proposed instruction schedule meets the predetermined set of optimization criteria comprises determining whether executing the proposed instruction schedule would yield iterations of the inner loop less than the minimum trip count.

8. The method of claim 1, wherein identifying the instruction of the inner loop comprises identifying a recurrence critical path of the inner loop, the recurrence critical path comprising the instruction.

9. The method of claim 1, further comprising: identifying the inner loop as an innermost loop of the source code listing.

10. A computer-implemented compiler system for throughput-aware software pipelining of an inner loop of a source code listing using a pipelining module of a computer-implemented compiler, the system comprising:
- a driver module, implemented in at least one processor such that the at least one processor is configured to identify an inner loop of a source code listing of a computer program for pipelining;
- a pipelining module, implemented in the at least one processor such that the at least one processor is configured to:
  - identify an instruction of the inner loop;
  - calculate a base latency for the instruction;
  - define a loop latency as the base latency for the instruction according at least to a scalarity of an assumed multi-threaded execution environment;
  - generate a proposed instruction schedule for the inner loop at least as a function of the loop latency in the pipelining module; and
  - calculate whether the proposed instruction schedule meets a predetermined set of optimization criteria; and
- a multi-thread optimization module, implemented in the at least one processor such that the at least one processor is configured, while the proposed instruction schedule does not meet the predetermined set of optimization criteria, to iteratively perform steps comprising:
  - reducing the loop latency in the pipelining module by reducing at least one of the scalarity or the base latency for the instruction;
  - regenerating the proposed instruction schedule for the inner loop at least as a function of the reduced loop latency in the pipelining module; and
  - calculating whether the regenerated proposed instruction schedule meets the predetermined set of optimization criteria.

11. The computer-implemented compiler system of claim 10, wherein the multi-thread optimization module is configured to iteratively perform steps further comprising:
- determining an assumed number of threads sharing core resources in a multi-threaded environment,
- wherein reducing the loop latency in the pipelining module comprises reducing the loop latency to substantially equal the base latency divided by the assumed number of threads sharing core resources.

12. The computer-implemented compiler system of claim 10, wherein the multi-thread optimization module is configured to iteratively perform steps further comprising:
- determining an assumed number of threads sharing core resources in a multi-threaded environment; and
- determining whether reducing the loop latency by a predetermined increment would cause the loop latency to be less than the base latency divided by the assumed number of threads sharing core resources,
- wherein reducing the loop latency in the pipelining module comprises incrementally reducing the loop latency by the predetermined increment when reducing the loop latency by the predetermined increment would not cause the loop latency to be less than the base latency divided by the assumed number of threads sharing core resources, and
- wherein reducing the loop latency in the pipelining module comprises incrementally reducing a scalarity of the multi-threaded environment when reducing the loop latency by the predetermined increment would cause the loop latency to be less than the base latency divided by the assumed number of threads sharing core resources.

13. The computer-implemented compiler system of claim 10, wherein the predetermined set of optimization criteria comprises a maximum register count, and the pipelining module is configured to calculate whether the proposed instruction schedule meets the predetermined set of optimization criteria by determining whether executing the proposed instruction schedule would require registers in excess of the maximum register count.

14. The computer-implemented compiler system of claim 10, wherein the predetermined set of optimization criteria comprises a maximum code size, and the pipelining module is configured to calculate whether the proposed instruction schedule meets the predetermined set of optimization criteria by determining whether compiling the inner loop according to the proposed instruction schedule would yield executable code in excess of the maximum code size.

15. The computer-implemented compiler system of claim 10, wherein the predetermined set of optimization criteria comprises a maximum trip count, and the pipelining module is configured to calculate whether the proposed instruction schedule meets the predetermined set of optimization criteria by determining whether executing the proposed instruction schedule would yield iterations of the inner loop in excess of the maximum trip count.

16. A computer program product having a pipelining module for throughput-aware software pipelining of an inner loop of a source code listing, the computer program product residing on a non-transitory, processor-readable medium and having processor-readable instructions, which, when executed, cause a processor to perform steps comprising:

identifying an instruction of the inner loop;
calculating a base latency for the instruction;
defining a loop latency in the pipelining module as the base latency for the instruction according at least to a scalarity of an assumed multi-threaded execution environment;
generating a proposed instruction schedule for the inner loop at least as a function of the loop latency in the pipelining module;
calculating whether the proposed instruction schedule meets a predetermined set of optimization criteria;
while the proposed instruction schedule does not meet the predetermined set of optimization criteria, iteratively performing steps comprising:
 reducing the loop latency in the pipelining module by reducing at least one of the scalarity or the base latency for the instruction;
 regenerating the proposed instruction schedule for the inner loop at least as a function of the reduced loop latency in the pipelining module; and
 calculating whether the regenerated proposed instruction schedule meets the predetermined set of optimization criteria; and
compiling the inner loop according to the proposed instruction schedule when the proposed instruction schedule meets the predetermined set of optimization criteria.

17. The computer program product of claim 16, wherein the processor-readable instructions, when executed, cause the processor to perform steps further comprising:
 determining an assumed number of threads sharing core resources in a multi-threaded environment; and
 determining whether reducing the loop latency by a predetermined increment would cause the loop latency to be less than the base latency divided by the assumed number of threads sharing core resources,
wherein reducing the loop latency in the pipelining module comprises incrementally reducing the loop latency by the predetermined increment when reducing the loop latency by the predetermined increment would not cause the loop latency to be less than the base latency divided by the assumed number of threads sharing core resources, and
wherein reducing the loop latency in the pipelining module comprises incrementally reducing a scalarity of the multi-threaded environment when reducing the loop latency by the predetermined increment would cause the loop latency to be less than the base latency divided by the assumed number of threads sharing core resources.

* * * * *